United States Patent [19]

Handl

[11] 4,023,974

[45] May 17, 1977

[54] UNBURNT LEAD REFILL FOR WRITING AND DRAWING PENCILS

[75] Inventor: Werner Handl, Altdorf, Germany

[73] Assignee: J. S. Staedtler, Nurnberg, Germany

[22] Filed: Sept. 8, 1975

[21] Appl. No.: 611,394

[30] Foreign Application Priority Data

Sept. 7, 1974 Germany .......................... 2442983

[52] U.S. Cl. .................................. 106/26; 106/22; 106/23; 106/31
[51] Int. Cl.² ........................................ C09D 11/14
[58] Field of Search .............................. 106/19–23, 106/26, 31

[56] References Cited

UNITED STATES PATENTS

| | | | |
|---|---|---|---|
| 2,105,310 | 1/1938 | Chesler | 106/19 |
| 2,566,754 | 9/1951 | Van Dusen et al. | 106/19 |
| 2,682,476 | 6/1954 | Nurnberg | 106/19 |

*Primary Examiner*—J. Ziegler

[57] ABSTRACT

An unburnt lead refill for writing and drawing pencils, particularly for use on drawing cloth, consisting of dyestuff, lubricant, filling material, binding agent and, if required, wax. The binding agent is methyl cellulose and/or methyl hydroxy-ethyl cellulose and/or methyl hydroxy-propyl cellulose and/or hydroxy-ethyl cellulose which is/are dissolved in water and emulsified with an addition of benzyl alcohol, benzaldehyde or a mixture of benzyl alcohol and benzaldehyde.

5 Claims, No Drawings

UNBURNT LEAD REFILL FOR WRITING AND DRAWING PENCILS

BACKGROUND OF THE INVENTION

The present invention relates to unburnt lead refills (pencil lead) for writing and drawing pencils, particularly for writing and drawing on drawing cloth (transparent foil), consisting of dyestuff, lubricant, filling material and binding agent, and, if required, wax.

These unburnt lead refills as a rule use synthetics, natural or synthetic resins, cellulose derivatives or similar items as binding agent, using suitable solvents or water for solution. Occasionally, hardeners are used. It is also known in the art how to manufacture lead refills without solvent or water, by mixing suitable synthetics or resins with the remaining components and plasticising them by heating. The resultant mass is shaped at a temperature corresponding to the plasticity point of the binding agent used.

In practical use, the braking strength and the elasticity of these lead refills leaves much to be desired. Another disadvantage is that they are either insoluble in water or too easily water-soluble, while the "medium" condition desired for practical use is not attained. The high degree of evaporation of conventional solvents frequently leads to warpage of the usually extruded lead refills. This warpage is the more prevalent for the thinner lead refills. With lead refills without solvents where the constituents are plasticised through heating, there occur, through thermal differences, stresses which also may lead to a deformation of the finished lead refill. Heretofore, these difficulties have not been effectively dealt with.

It is, therefore, an object of the present invention to provide an unburnt lead refill which has the properties of the known synthetic lead refills, but which is distinguished by a maximum of dimensional stability, breaking strength, elasticity and a medium condition with regard to water solubility. The medium condition regarding water solubility is important because the traces of completely water-insoluble lead refills are practically incorrectable, while with too high a water solubility the traces smear very easily.

SUMMARY OF THE INVENTION

The objects of the present invention are achieved by providing that the binding agent is methyl cellulose and/or methyl hydroxy-ethyl cellulose and/or methyl hydroxy-propyl cellulose and/or hydroxy-ethyl cellulose which is dissolved in water or emulsified with an addition of benzyl alcohol, benzaldehyde or a mixture of benzyl alcohol and benzaldehyde. The cellulose derivatives mentioned are preferably used with an average substitution degree of approx. 0.2 – 0.3. While the ordinarily extruded lead refills in accordance with the present invention are drying, the water evaporates, while benzyl alcohol/benzaldehyde because of the high evaporation factor of 1,700 – 1,800 (ether = 1) remains in the lead refill. With the subsequent temperature treatment of approx. 20° C to 110° C with a temperature rise of 20°–30° C per hour under standard atmosphere the methyl cellulose and/or methyl hydroxy-ethyl- and/or methyl hydroxy-propyl and/or hydroxy-ethyl cellulose undergoes cross-linking through an aldehyde reaction.

DESCRIPTION OF THE PREFERRED EMBODIMENTS

The following schematic shows the interconnection of two cellulose ether chains through (via) benzaldehyde. The macromolecules are represented by vertical lines with one hydroxyl group each.

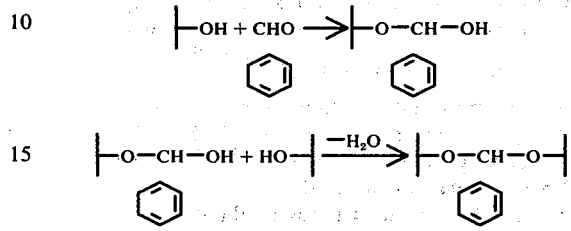

This reaction leads to age hardening of the methyl cellulose and/or methyl hydroxy-ethyl cellulose and/or methyl hydroxypropyl cellulose and/or hydroxy-ethyl cellulose without giving off the reaction product too quickly as happens with the substances already known in the art at room temperature with the resulting warpage of the lead refills. In the case at hand, the benzyl alcohol, of which one may assume that part of it through the temperature load oxidizes into benzaldehyde, and the benzaldehyde is given off very slowly so that no stresses and hence no deformations occur in the lead refill.

One may further assume that part of the benzaldehyde oxidizes into benzoic acid with the latter being capable of polymerization and thus contributing to the strenth.

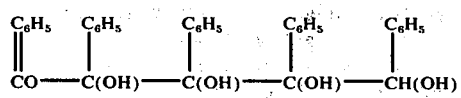

Hence, the finished lead refill comprises crosslinked and partially cross-linked methyl cellulose and/or methyl hydroxy-ethyl cellulose and/or methyl hydroxy-propyl cellulose and/or hydroxy-ethyl cellulose.

Since the products to be cross-linked in accordance with the present invention are non-iogenic substances, one need not consider the iso-electric point of the other components within a certain pH range.

Surprisingly, the lead refill in accordance with the present invention is distinguished by a high degree of elasticity. In addition, it is smear-proof and, nevertheless, can be easily erased.

In addition, the present invention extends to a procedure for manufacturing the lead refills of the present invention. The methyl cellulose and/or methyl hydroxy-ethyl cellulose and/or methyl hydroxy-propyl cellulose and/or hydroxy-ethyl cellulose is dissolved in water; benzyl alcohol, benzaldehyde or a mixture of benzyl alcohol and benzaldehyde is added and emulsified; dyestuff, lubricant, filling material and, if desired, wax is kneaded into the mixture and the lead refill is formed from it. Since within the cellulose chain on each glucose unit only 1 or 2 of the total of 3 available OH groups are etherified, the simultaneous presence of pronouncedly hydrophobic and hydrophilic zones in the molecule leads to a significant reduction of the surface tension of the water; as a result, the benzyl alcohol/benzaldehyde mixture can easily be emulsified into the solution. In addition, benzyl alcohol has the advantage of being an excellent dispersing agent for dyestuffs and pigments. Then the lead refill is molded, usually by the extruding method.

The procedure in accordance with the present invention also has the advantage of being able to use water to a large extent, since aqueous systems as a rule are more economical, less cumbersome and less harzardous.

Examples of the composition of the lead refill in accordance with the present invention are as follows:

EXAMPLE 1

24.0 parts by weight of aluminum stearate
14.0 parts by weight of soot (carbon black)
33.0 parts by weight of kaolin
4.0 parts by weight of paraffin
25.0 parts by weight of methyl cellulose The methyl cellulose is dissolved in 90 parts water and then emulsified with 9 parts benzyl alcohol and 1 part benzaldehyde. After emulsification, the remaining components are kneaded in, the lead refill is extruded and, after a slow temperature increase, is stored for several hours at approx. 110° C.

EXAMPLE 2

24.0 parts by weight of aluminum stearate
14.0 parts by weight of soot (carbon black)
35.0 parts by weight of kaolin
2.0 parts by weight of graphite
25.0 parts by weight of methyl hydroxy-ethyl cellulose The production proceeds in accordance with Example 1.

EXAMPLE 3

20.0 parts by weight of aluminum stearate
20.0 parts by weight of phthalocyanine blue
10.0 parts by weight of titanium oxide
25.0 parts by weight kaolin
25.0 parts by weight of methyl cellulose The production proceeds in accordance with Example 1. However, the lead refills after pressing (forming) are stored for several hours at room temperature, then are gradually heated with step-wise temperature increase to approx 110° C; they are left at this temperature for several hours and then are allowed to cool gradually. This special temperature treatment favorably influences the percentage of breakage of the lead refills and counteracts warpage.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range or equivalence of the following claims.

I claim:

1. An unburnt pencil lead for writing and drawing pencils, comprising dyestuff, lubricant, filling material, binding agent, said binding agent being selected from the group of methyl cellulose, methyl hydroxy-ethyl cellulose, methyl hydroxy-propyl cellulose, and hydroxy ethyl cellulose, which has been at least partially cross-linked with benzaldehyde.

2. The unburnt pencil lead as defined in claim 1 including wax added to said dyestuff, lubricant, filling material, and binding agent.

3. A method for the production of pencil lead for writing and drawing pencils comprising the steps of combining dyestuff, lubricant, filling material, and binding agent, said binding agent being selected from the group of methyl cellulose, methyl hydroxy-ethyl cellulose, methyl hydroxy-propyl cellulose, and hydroxy-ethyl cellulose, dissolving said binding agent in water, adding an interconnecting agent selected from the group consisting of benzyl alcohol, benzaldehyde, and a mixture of benzyl alcohol and benzaldehyde to said bonding agent in water, adding thereafter said dyestuff, lubricant, and filling material, forming said lead refill, and drying said refill at temperatures within the range of room temperature and 110° C.

4. The method as defined in claim 3 including the step of adding wax to said dyestuff, lubricant, filling material, and binding agent.

5. The method as defined in claim 3 wherein said pencil lead is formed by extrusion.

* * * * *